US012690659B2

(12) United States Patent
Hisano et al.

(10) Patent No.: US 12,690,659 B2
(45) Date of Patent: Jul. 28, 2026

(54) SERVER AND PROGRAM

(71) Applicants: Shiseido Company, Ltd., Tokyo (JP);
Nomura Research Institute, Ltd.,
Tokyo (JP)

(72) Inventors: Keiichiro Hisano, Tokyo (JP);
Kiyotoshi Komuta, Tokyo (JP);
Hironori Katsura, Tokyo (JP); Yuma Shouji, Tokyo (JP)

(73) Assignees: Shiseido Company, Ltd., Tokyo (JP);
Nomura Research Institute, Ltd.,
Tokyo (JP)

( * ) Notice: Subject to any disclaimer, the term of this
patent is extended or adjusted under 35
U.S.C. 154(b) by 1148 days.

(21) Appl. No.: 17/622,545

(22) PCT Filed: Jun. 28, 2019

(86) PCT No.: PCT/JP2019/025795
§ 371 (c)(1),
(2) Date: Dec. 23, 2021

(87) PCT Pub. No.: WO2020/261527
PCT Pub. Date: Dec. 30, 2020

(65) Prior Publication Data
US 2022/0354233 A1 Nov. 10, 2022

(51) Int. Cl.
*A45D 34/00* (2006.01)
*G06V 10/77* (2022.01)

(52) U.S. Cl.
CPC ......... *A45D 34/00* (2013.01); *G06V 10/7715*
(2022.01); *A45D 2034/005* (2013.01)

(58) Field of Classification Search
CPC ............. A45D 34/00; A45D 2034/005; G06V
10/7715; G06V 40/10; G06Q 10/08;
G06Q 50/10
See application file for complete search history.

(56) References Cited

U.S. PATENT DOCUMENTS 8,636,173 B2 * 1/2014 Bartholomew ....... B01F 33/844
222/1
10,849,832 B2 * 12/2020 Belkhir .................. A45D 34/00
(Continued)

FOREIGN PATENT DOCUMENTS

JP 2001-137216 A 5/2001
JP 2005-148797 A 6/2005
(Continued)

*Primary Examiner* — Michael Collins
(74) *Attorney, Agent, or Firm* — Foley & Lardner LLP

(57) ABSTRACT
A server can be connected to a dispenser configured to dispense a dispensed material.
The server includes a retrieving module configured to retrieve skin information on a user's skin condition, a determination module configured to determine recipe information for the dispensed material with reference to the skin condition indicated by the skin information, a transmission module configured to transmit the recipe information to the dispenser to cause the dispenser to dispense the dispensed material in accordance with the recipe information, and an arrangement module configured to arrange for the provision of an additional cartridge to the user of the dispenser if the remaining amount of the dispensed material remaining in the cartridge of the dispenser is less than a predetermined threshold.

13 Claims, 13 Drawing Sheets

—(1) TRANSMITTING
SKIN INFORMATION (2) TRANSMITTING
RECIPE INFORMATION

USER (3) DISPENSING DISPENSED MATERIAL

DISPENSER
50

(4) DELIVERYING ADDITIONAL CARTRIDGES
(IF REMAINNG AMOUNT < THRESHOLD)

(56)             References Cited

U.S. PATENT DOCUMENTS

| | | | |
|---|---|---|---|
| 11,076,683 B2 * | 8/2021 | Wiltord | G06F 3/0482 |
| 11,832,711 B2 * | 12/2023 | Pack | B01F 33/8442 |
| 11,857,060 B2 * | 1/2024 | Pack | G06Q 20/322 |
| 11,900,434 B2 * | 2/2024 | Charraud | G06Q 30/0631 |
| 2009/0327033 A1 | 12/2009 | Rai et al. | |
| 2017/0154372 A1 * | 6/2017 | Balooch | B01F 33/846 |
| 2017/0208920 A1 * | 7/2017 | Thiebaut | B01F 33/841 |
| 2017/0208921 A1 * | 7/2017 | Thiebaut | B01F 33/841 |
| 2017/0228892 A1 * | 8/2017 | Nichol | B65D 83/763 |
| 2020/0281340 A1 | 9/2020 | Matsuda et al. | |
| 2020/0315321 A1 * | 10/2020 | Wiltord | A45D 34/04 |
| 2021/0076807 A1 * | 3/2021 | Pack | B01F 33/8442 |
| 2021/0146560 A1 * | 5/2021 | Panagiotopoulou | B26B 21/44 |
| 2021/0236390 A1 * | 8/2021 | Charraud | G06Q 30/0631 |
| 2021/0354157 A1 * | 11/2021 | Graham | B05B 11/1035 |

FOREIGN PATENT DOCUMENTS

| | | | |
|---|---|---|---|
| JP | 2010-009596 A | 1/2010 | |
| JP | 2014-152152 A | 8/2014 | |
| WO | WO-2018/216860 A1 | 11/2018 | |
| WO | WO-2019/103127 A1 | 5/2019 | |

* cited by examiner

1

10

30

(1) TRANSMITTING SKIN INFORMATION

USER (2) TRANSMITTING RECIPE INFORMATION (3) DISPENSING DISPENSED MATERIAL

DISPENSER
50

(4) DELIVERYING ADDITIONAL CARTRIDGES
(IF REMAINNG AMOUNT < THRESHOLD)

| USER INFORMATION DATABASE | | | | | | |
|---|---|---|---|---|---|---|
| USER ID | USER NAME | USER ATTRIBUTE | | OWNED MACHINE ID | ADDRESS | DELIVERY PREFERENCE |
| | | GENDAR | AGE | | | |
| U001 | U1 | MALE | 30 | DEV01 | ... | 10th AM |
| U002 | U2 | FEMALE | 25 | DEV02 | ... | 1st PM |
| ... | ... | ... | ... | ... | ... | ... |

FIG. 7

| RECIPE INFORMATION DATABASE | | |
|---|---|---|
| RECIPE ID | RECIPE | |
| | CARTRIDGE ID | DISPENSING AMOUNT |
| REC01 | CA01 CA02 | 1 2 |
| REC02 | CA01 CA03 CA04 | 1 1 2 |
| REC03 | CA02 | 5 |
| ... | ... | ... |

FIG. 8

| USER LOG INFORMATION DATABASE (USER ID = U001) | | | | | |
|---|---|---|---|---|---|
| USER LOG ID | DATE AND TIME | INTERNAL SKIN FACTOR | | SKIN CONDITION | RECIPE ID |
| | | SKIN IMAGE | QUESTIONNAIRE | | |
| ULOG01 | 01/01/2019_10:00 | IMG01 | ... | SKIN01 | REC01 |
| ULOG02 | 2019/01/02_22:00 | IMG02 | ... | SKIN02 | REC02 |
| ... | ... | ... | ... | ... | ... |

FIG. 9

| MACHINE INFORMATION DATABASE | | | |
| --- | --- | --- | --- |
| MACHINE ID | FIRMWARE | CARTRIDGE | |
| | | CARTRIDGE ID | REMAINING AMOUNT |
| DEV01 | VER1.11 | CA01<br>CA02<br>CA03<br>CA04<br>CA05 | 10<br>8<br>8<br>12<br>6 |
| DEV02 | VER1.2 | CA01<br>CA02<br>CA08<br>CA09<br>CA05 | 10<br>3<br>5<br>8<br>12 |
| ... | ... | ... | ... |

FIG. 10

| DELIVERY LOG INFORMATION DATABASE (USER ID = U01) | | |
|---|---|---|
| DELIVERY LOG ID | DATE AND TIME | CARTRIDGE ID |
| SLOG01 | 01/01/2019_10:05 | CA01 |
| SLOG02 | 2019/01/02_15:05 | CA02 |
| ... | ... | ... |

SERVER AND PROGRAM

CROSS-REFERENCE TO RELATED APPLICATIONS

This application is the U.S. National Stage of PCT/JP2019/025795, filed Jun. 28, 2019.

TECHNICAL FIELD

The present invention relates to a server and a program.

BACKGROUND ART

In general, consumers who purchase beauty products choose products based on their own skin conditions.

Since there is a wide variety of beauty products, the consumers need to decide on the combination of beauty products according to their own skin conditions.

Technology is known that facilitates the provision of beauty products to each of these consumers.

For example, JP 2014-152152 discloses a cosmetic liquid blender for discharging a cosmetic liquid contained in a cosmetic liquid tank.

SUMMARY OF INVENTION

Technical Problem

In recent years, attention has been focused on services that provide beauty products to consumers at any location and any timing by having the consumers possess a cosmetic liquid blender such as that described in JP 2014-152152.

However, in JP 2014-152152, when the cosmetic liquid tank is empty, the cosmetic liquid cannot be provided.

In this case, the consumer will need to purchase a new cosmetic liquid tank.

Therefore, a consumer using the cosmetic liquid blender needs to be aware of the remaining amount of cosmetic liquid contained in the cosmetic liquid tank in order to continue obtaining cosmetic liquid.

It is an object of the present invention to continuously provide a user with a dispensed material without making the user aware of the remaining amount of the dispensed material contained in a cartridge disposed in a dispenser that dispenses the dispensed material according to a skin condition of the user.

Solution to Problem

One aspect of the present invention is
a server that can be connected to a dispenser configured to dispense a dispensed material, the server comprising:
a retrieving module configured to retrieve skin information on a user's skin condition;
a determination module configured to determine recipe information for the dispensed material with reference to the skin condition indicated by the skin information;
a transmission module configured to transmit the recipe information to the dispenser to cause the dispenser to dispense the dispensed material in accordance with the recipe information; and
an arrangement module configured to arrange for the provision of an additional cartridge to the user of the dispenser if the remaining amount of the dispensed material remaining in the cartridge of the dispenser is less than a predetermined threshold.

Advantageous Effects of Invention

According to the present invention, in a dispenser that dispenses the dispensed material according to a skin condition of a user, the dispensed material can be continuously provided to the user without making the user aware of the remaining amount of the dispensed material contained in a cartridge disposed in the dispenser.

BRIEF DESCRIPTION OF DRAWINGS

FIG. 6 shows the data structure of the user information database of the present embodiment.

FIG. 7 shows the data structure of the recipe information database of the present embodiment.

FIG. 8 shows the data structure of the user log information database of the present embodiment.

FIG. 9 shows the data structure of the machine information database of the present embodiment.

FIG. 10 shows the data structure of the delivery log information database of the present embodiment.

DESCRIPTION OF EMBODIMENTS

Figure 1:
FIG. 1 is a block diagram showing the configuration of the information processing system of the present embodiment.
Figure 1:
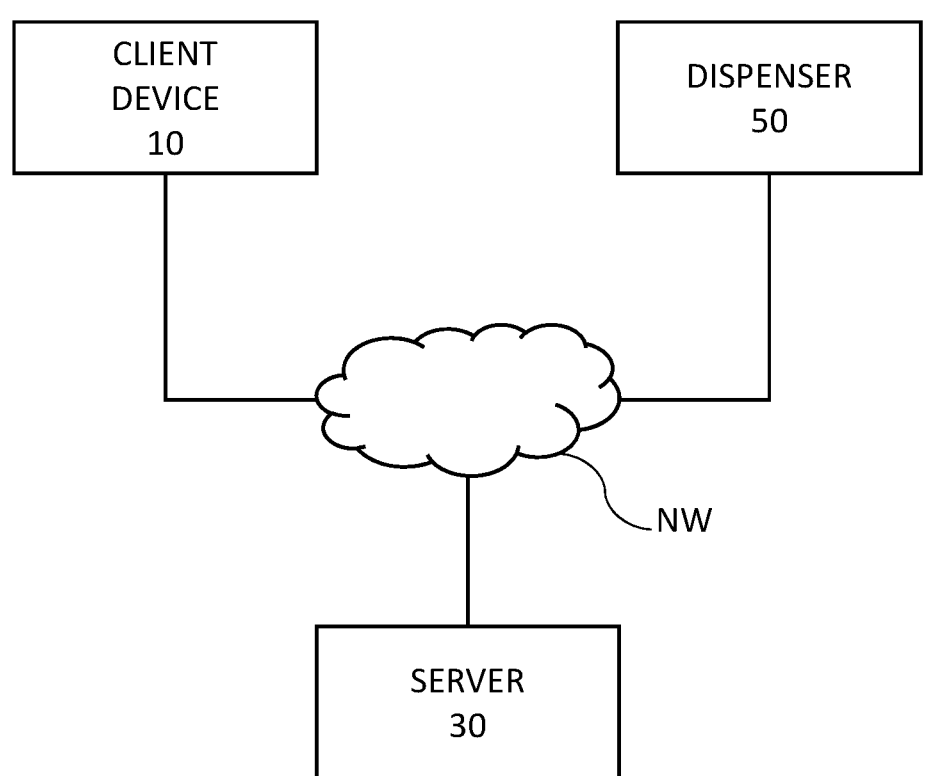

Hereinafter, an embodiment of the present invention is described in detail based on the drawings.

Note that, in the drawings for describing the embodiments, the same components are denoted by the same reference sign in principle, and the repetitive description thereof is omitted.

(1) Configuration of Information Processing System

This section describes the configuration of the information processing system.

FIG. 1 is a block diagram showing the configuration of the information processing system of the present embodiment.

Figure 2:
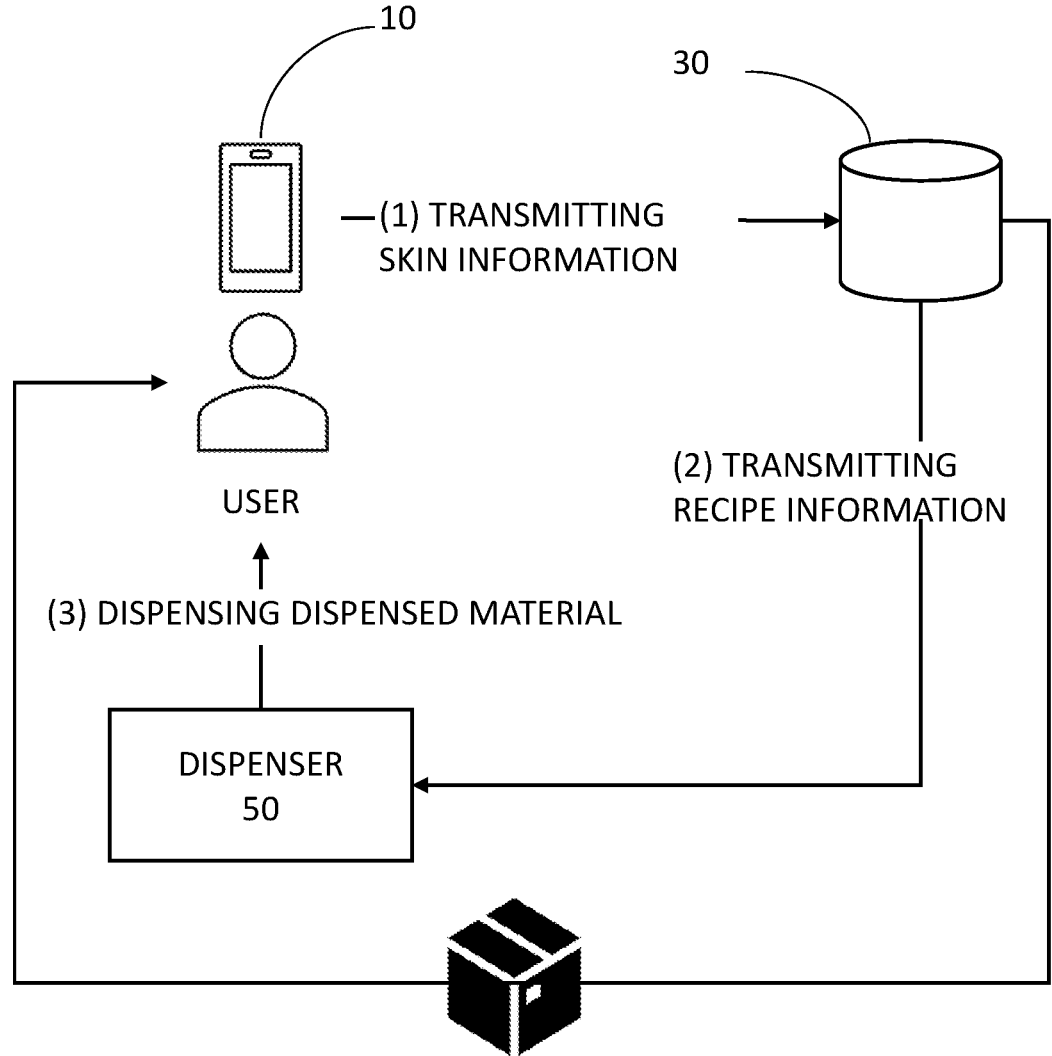
FIG. 2 shows an overview of the present embodiment.

FIG. 2 shows an overview of the present embodiment.

As shown in FIG. 1, an information processing system 1 includes a client device 10, a server 30, and a dispenser 50.

The client device 10, the server 30, and the dispenser 50 are connected via a network (e.g., the Internet or an intranet) NW.

The client device 10 is an example of an information processing apparatus that sends a request to the server 30.

The client device 10 is, for example, a smart phone, a tablet device, or a personal computer.

The server 30 is an example of an information processing apparatus that provides a response to a request sent from the client device 10 to the client device 10.

The server 30 is, for example, a web server.

The dispenser 50 includes a cartridge (described below) that contains a predetermined dispensed material.

The dispenser 50 is configured to dispense the dispensed material contained in the cartridge in response to instructions from the server 30.

As shown in FIG. 2, the server 30 can be connected to the dispenser 50 configured to dispense a dispensed material contained in a cartridge, and the client device 10 used by a user.

The client device 10 transmits skin information on the user's skin condition to the server 30.

The server 30 retrieves skin information from the client device 10.

The server 30 determines the recipe information for the dispensed material with reference to the skin condition indicated by the skin information.

The server 30 transmits the recipe information to the dispenser 50 to cause the dispenser 50 to dispense the dispensed material in accordance with the recipe information.

The server 30 arranges for provision of an additional cartridge to be provided to a user of the dispenser 50 if the remaining amount of the dispensed material contained in the cartridge is less than a predetermined threshold.

(1-1) Configuration of the Client Device

The configuration of the client device 10 is described below.

Figure 3:
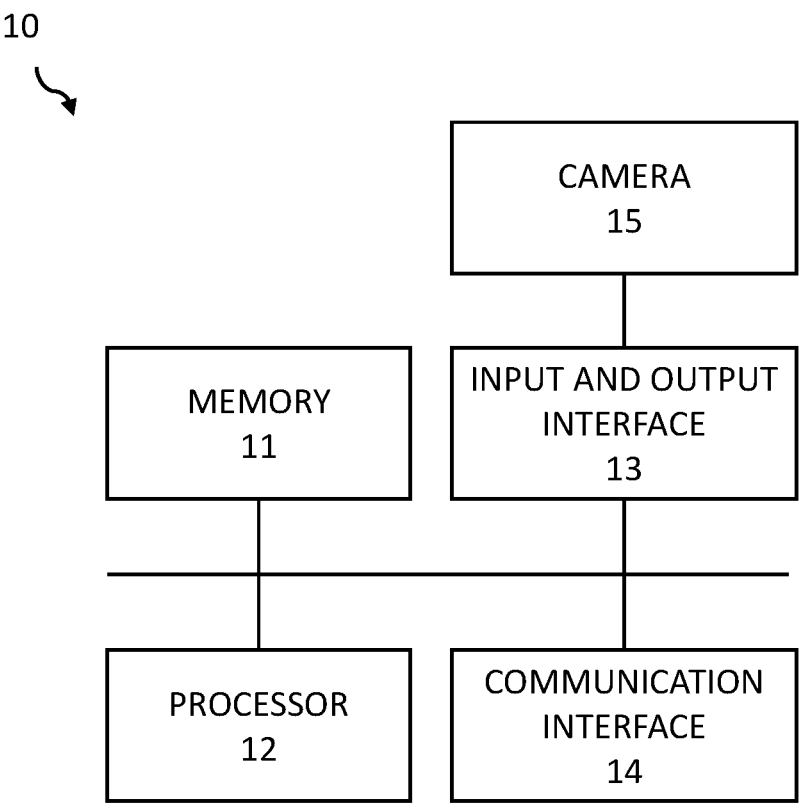
FIG. 3 is a functional block diagram of the client device of FIG. 1.

FIG. 3 is a functional block diagram of the client device of FIG. 1.

As shown in FIG. 3, the client device 10 includes a memory 11, a processor 12, an input/output interface 13, a communication interface 14, and a camera 15.

The memory 11 is configured to store a program and data.

The memory 11 is, for example, a combination of a ROM (read only memory), a RAM (random access memory), and a storage (for example, a flash memory or a hard disk).

The program includes, for example, the following programs:

OS (Operating System) program; and

Programs for applications that perform information processing (e.g., web browsers and sleep log applications configured to retrieve sleep logs).

The data includes, for example, the following data:

Data referenced in an information processing;

Data obtained by executing an information processing (that is, an execution result of an information processing); and Sleep log information on the sleep log obtained by the sleep log application.

The processor 12 is configured to realize the functions of the client device 10 by starting a program stored in the memory 11.

The processor 12 is an example of a computer.

The input/output interface 13 is configured to retrieve user instructions from an input device connected to the client device 10 and to output information to an output device connected to the client device 10.

The input device is, for example, a keyboard, a pointing device, a touch panel, or a combination thereof.

The output device is, for example, a display.

The communication interface 14 is configured to control communication via the network NW.

The camera 15 is configured to capture images.

(1-2) Server Configuration

The configuration of the server 30 is described below.

Figure 4:
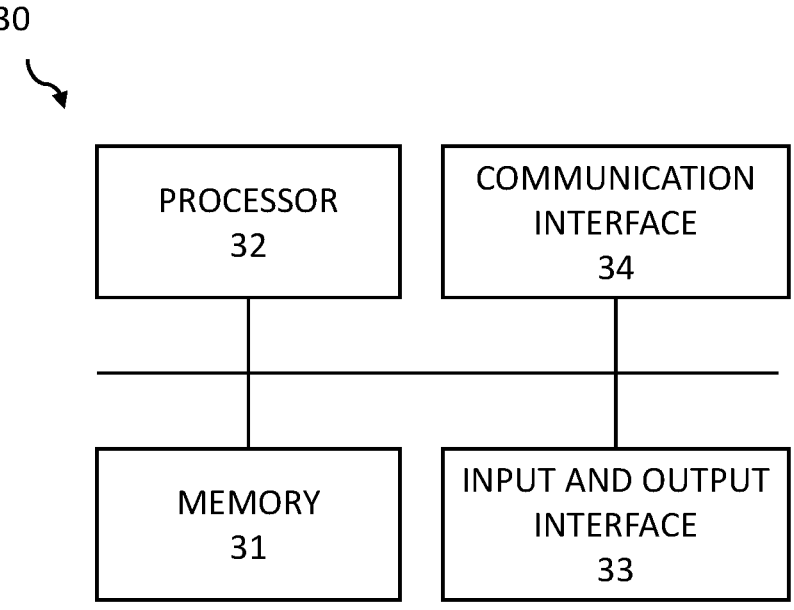
FIG. 4 is a functional block diagram of the server of FIG. 1.

FIG. 4 is a functional block diagram of the server in FIG. 1.

As shown in FIG. 4, the server 30 includes a memory 31, a processor 32, an input/output interface 33, and a communication interface 34.

The memory 31 is configured to store a program and data.

The memory 31 is, for example, a combination of ROM, RAM, and storage (for example, flash memory or hard disk).

The program includes, for example, the following programs:

OS program; and

Application program to execute information processing.

The data includes, for example, the following data:

Data referenced in an information processing; and

Execution result of information processing.

The processor 32 is configured to realize the functions of the server 30 by starting a program stored in the memory 31.

The processor 32 is an example of a computer.

The input/output interface 33 is configured to retrieve user instructions from an input device connected to the server 30 and to output information to an output device connected to the server 30.

The input device is, for example, a keyboard, a pointing device, a touch panel, or a combination thereof.

The output device is, for example, a display.

The communication interface 34 is configured to control communication via the network NW.

(1-3) Configuration of Dispenser

The configuration of the dispenser 50 is described below.

FIG. 5 is a functional block diagram of the dispenser of FIG. 1.

Figures 5A, 5B:
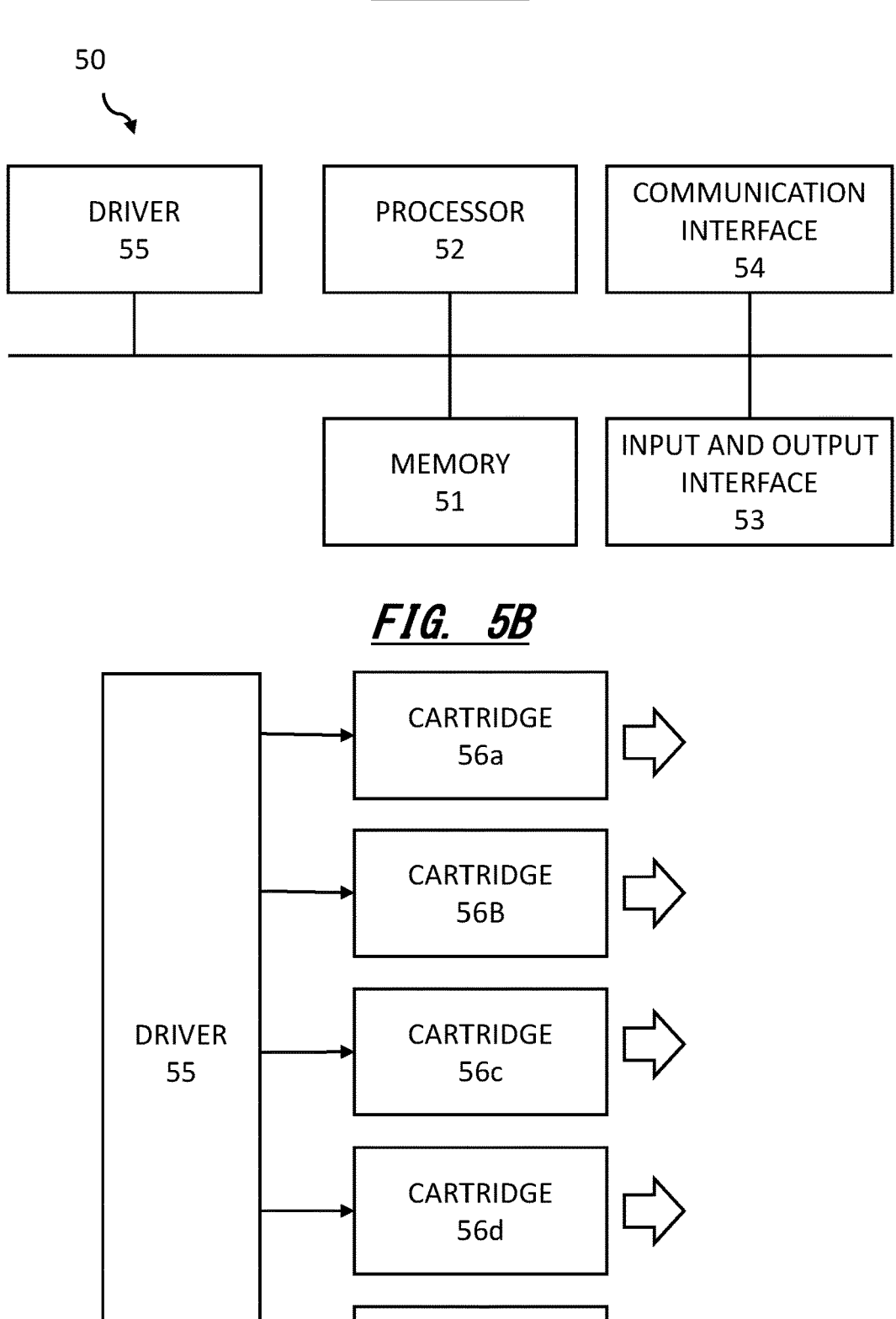
FIG. 5 is a functional block diagram of the dispenser of FIG. 1.

As shown in FIG. 5A, the dispenser 50 includes a memory 51, a processor 52, an input/output interface 53, a communication interface 54, and a driver 55.

The memory 51 is configured to store a program and data.

The memory 51 is, for example, a combination of ROM, RAM, and storage (for example, flash memory or hard disk).

The program includes, for example, the following programs:

OS program; and

Application program to execute information processing.

The data includes, for example, the following data:

Data referenced in an information processing; and

Execution result of information processing.

The processor 52 is configured to realize the functions of the dispenser 50 by starting a program stored in the memory 51.

The processor 52 is an example of a computer.

The input/output interface 53 is configured to obtain user instructions from an input device connected to the dispenser 50 and to output information to an output device connected to the dispenser 50.

The input device is, for example, a keyboard, a pointing device, a touch panel, or a combination thereof.

The output device is, for example, a display.

The communication interface 54 is configured to control communication via the network NW.

As shown in FIG. 5B, the dispenser 50 includes a plurality of cartridges 56a to 56e connected to the driver 55.

The cartridges 56a to 56e contain dispensed material.

The dispensed material includes at least one of the following:

An application agent that can be applied to the skin of a human body (for example, a skin care item, a basic cosmetic product, a foundation, and combinations thereof);

Air-dispersible fragrances (e.g., aromatic oils); and

Supplements (e.g., nutritional supplements such as vitamins, minerals, or amino acids, supplements such as herbs and other ingredients for medicinal purposes, herbal medicines, enzymes, dietary supplements, etc.).

The dispensed material contained in the cartridges 56a to 56e is dispensed according to the control of the processor 52.

The cartridges 56a to 56e include integrated circuit (IC) chips (not shown).

The IC chip stores cartridge identification information that identifies each cartridge 56a to 56e.

Each of the cartridges 56a to 56e belongs to one of a plurality (e.g., five) of cartridge groups (e.g., groups A to E).

The cartridge group means the efficacy of the dispensed material contained in the cartridge.

In other words, the cartridges belonging to each cartridge group contain the dispensed material that shows the efficacy corresponding to each cartridge group.

A group of cartridges can be classified into some subclasses.

Each subclass shows a different type of the dispensed material from each other.

For example, a cartridge corresponding to the cartridge A group contains the dispensed material that is classified into any of a plurality of subclasses (e.g., A1 to A3) among the dispensed material having efficacy corresponding to the A group.

(2) Database

This section describes the database of the present embodiment.

The following database is stored in the memory 31.

(2-1) User Information Database

The user information database of the present embodiment is described below.

FIG. 6 shows the data structure of the user information database of the present embodiment.

The user information database in FIG. 6 stores user information on users.

The user information database includes a "user ID" field, a "user name" field, a "user attributes" field, an "owned machine ID" field, an "address" field, and a "delivery preference" field.

Each field is associated with each other.

The "user ID" field stores user identification information that identifies a user.

The "user name" field stores information (e.g., text) about the user's name.

The "user attributes" field stores user attribute information on the user's attributes.

The "user attributes" field includes some sub-fields (the "gender" field and the "age" field).

The "gender" field stores information on the user's gender.

The "age" field stores information on the user's age.

The "owned machine ID" field stores machine identification information that identifies the dispenser 50 owned by the user is stored.

The "address" field stores information on the user's address or designated address (hereinafter referred to as "delivery address information").

The "delivery request" field stores information on the user's request regarding the delivery timing of the next cartridge (hereinafter referred to as "delivery request information").

The delivery timing is, for example, "Saturday morning".

(2-2) Recipe Information Database

The recipe information database of the present invention is described below.

FIG. 7 shows the data structure of the recipe information database of the present invention.

The recipe information database of FIG. 7 stores recipe determination information referred for determining the recipe information to be transmitted to the dispenser 50.

The recipe information database includes a "recipe ID" field and a "recipe" field.

Each field is associated with each other.

The "recipe ID" field stores the recipe identification information that identifies the recipe.

The "recipe" field stores recipe information on a recipe.

The "recipe" field includes a plurality of subfields ("cartridge ID" field and "dispensing amount" field).

The "cartridge ID" field stores the cartridge identification information that identifies the cartridge.

The cartridge identification information indicates, for example, a cartridge group (for example, "Group A").

The "dispensing amount" field stores the dispensing amount information on the dispensing amount of the dispensed material indicated in the recipe.

The dispensing amount information is, for example, the number of times the dispensed material contained in each cartridge 56a to 56e is dispensed.

(2-4) User Log Information Database

The user log information database of the present embodiment is described below.

FIG. 8 shows the data structure of the user log information database of the present embodiment.

The user log information database of FIG. 8 stores user log information on a history of use of the dispenser 50 by a user (hereinafter referred to as a "user log").

The user log information database includes a "user log ID" field, a "date and time" field, an "internal skin factor" field, a "skin condition" field, and a "recipe ID" field.

Each field is associated with each other.

The user log information database is associated with the user identification information.

The "user log ID" field stores the user log identification information that identifies the user log.

The "date and time" field stores information on the date and time of the user log (e.g., the date and time when the user used the dispenser 50).

The "internal skin factor" field stores internal factor information on internal factors that affect the skin condition.

Internal factors are the factors caused by the user himself.

The "internal skin factors" field stores some subfields ("skin image" field and "questionnaire" field).

The "skin image" field stores the user's skin image (an example of "skin information").

The "questionnaire" field stores questionnaire information (an example of "skin information") about the results of questionnaires to the user (answers to questions).

The "skin condition" field stores information on the user's skin condition as determined from the skin image by the computer (e.g., processor 12 or 32).

The "recipe ID" field stores recipe identification information of a recipe indicating a combination of cartridges containing dispenses provided according to a skin condition and a combination of dispensing amount thereof.

(2-5) Machine Information Database

The machine information database of the present embodiment is described below.

FIG. 9 shows the data structure of the machine information database of the present embodiment.

The machine information database of FIG. 9 stores machine information on the dispenser 50.

The machine information database includes a "machine ID" field, a "firmware" field, and a "cartridge" field.

Each field is associated with each other.

The "machine ID" field stores the machine identification information of the dispenser 50.

The "firmware" field stores information on the version of the firmware of the dispenser 50.

The "cartridge" field stores cartridge information on cartridges 56a to 56e.

The "cartridge" field includes a plurality of subfields ("cartridge ID" field and "remaining amount" field).

The "cartridge ID" field stores the cartridge identification information of cartridges 56a to 56e disposed in the dispenser 50.

The "remaining amount" field stores the remaining amount values of the dispensed material contained in the cartridges 56a to 56e.

(2-6) Delivery Log Information Database

The delivery log information database of the present embodiment is described below.

FIG. 10 is a diagram showing the data structure of the delivery log information database of the present embodiment.

The delivery log information database of FIG. 10 stores delivery log information on the delivery history of the next cartridge to the user.

The delivery log information database includes a "delivery log ID" field, a "date and time" field, and a "cartridge ID" field.

Each field is associated with each other.

The delivery log information database is associated with the user identification information.

The "delivery log ID" field stores the delivery log identification information that identifies the delivery log information.

The "date and time" field contains information on the date and time the next cartridge has been delivered.

(3) Information Processing

The information processing of the present embodiment is described below.

(3-1) Dispensing Process

The dispensing process of the present embodiment is described below.

Figure 11:
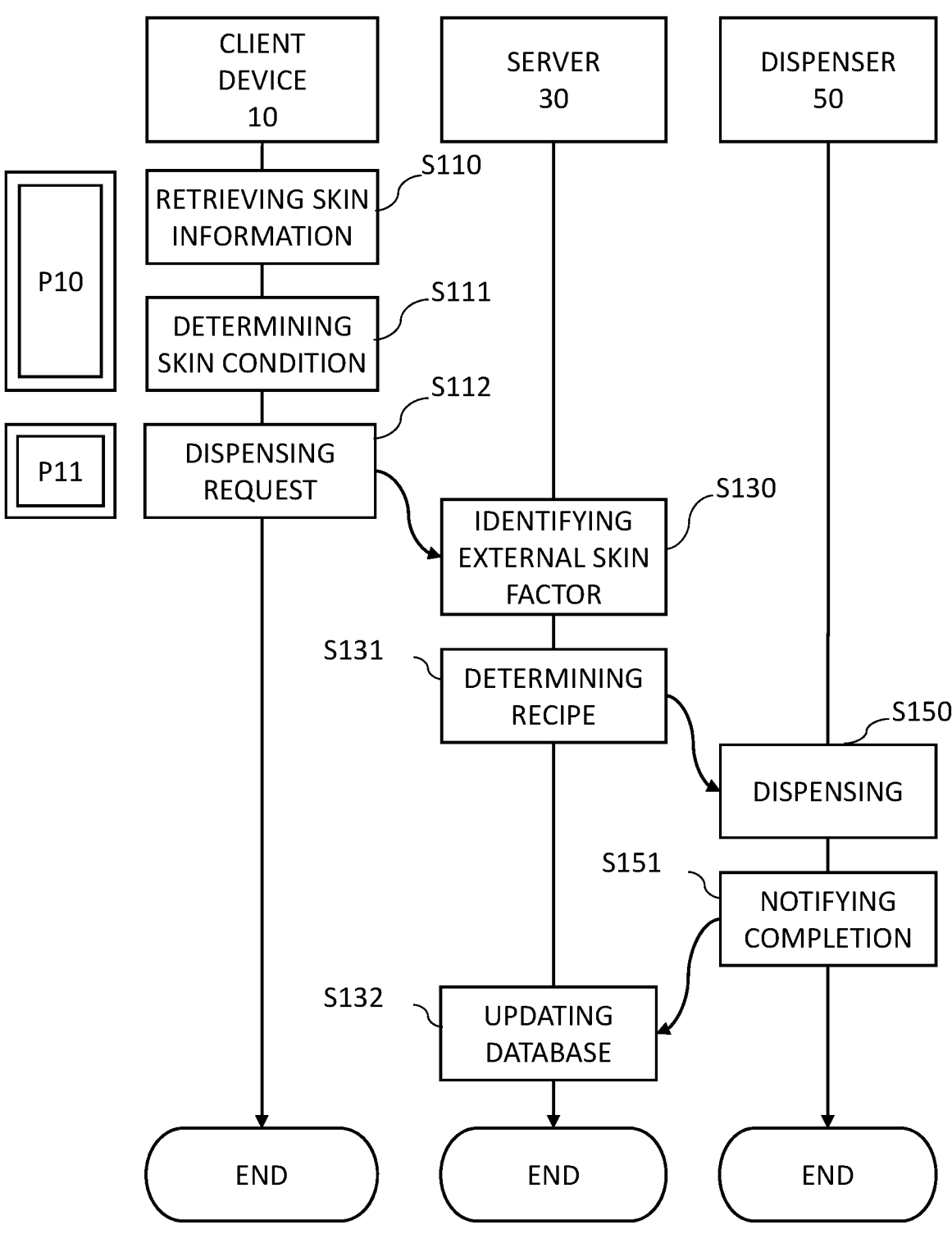
FIG. 11 is a sequence diagram of the dispensing process of the present embodiment.

FIG. 11 is a sequence diagram of the dispensing process of the present embodiment.

Figure 12:
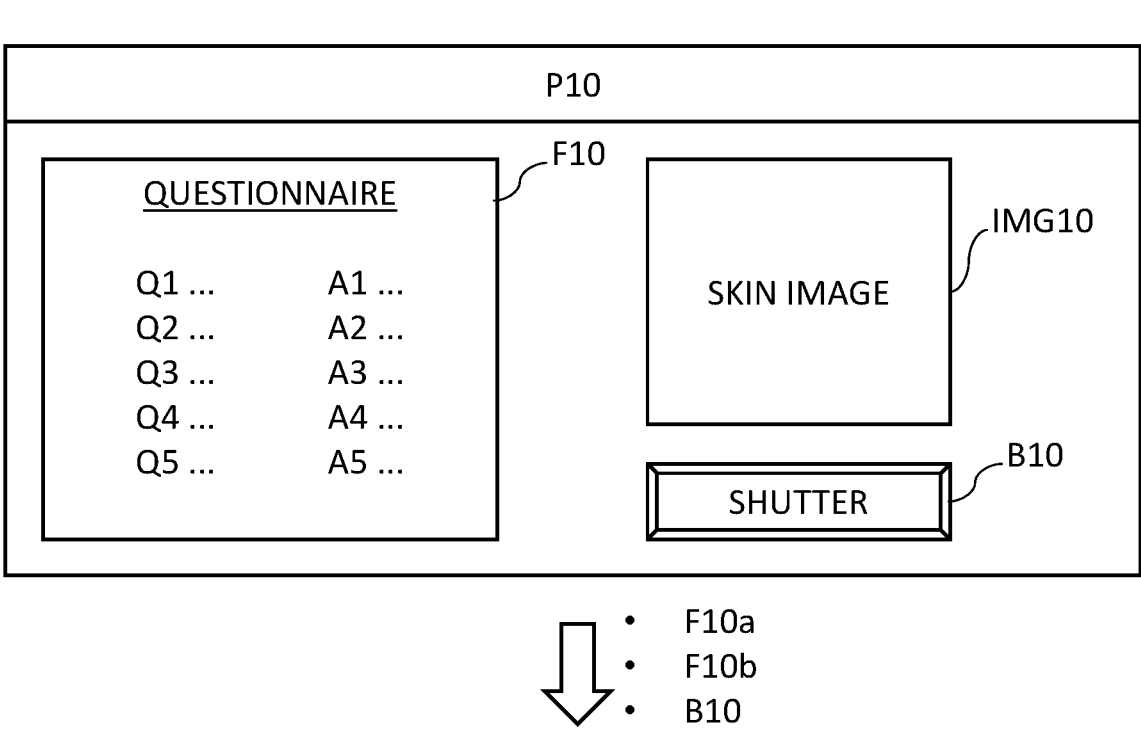
FIG. 12 shows an example of a screen displayed in the process of FIG. 11.
Figure 12:
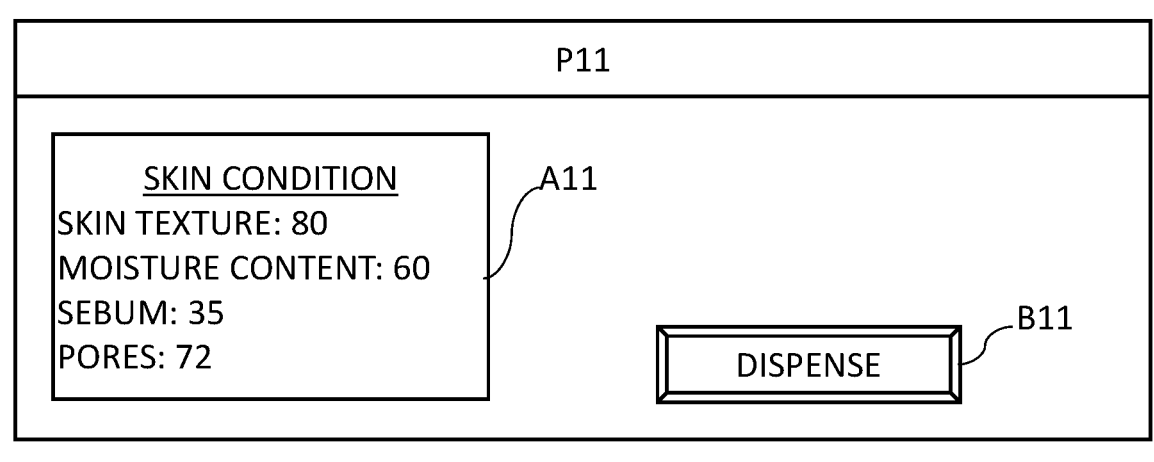

FIG. 12 shows an example of a screen displayed in the process of FIG. 11.

As shown in FIG. 11, the client device 10 performs retrieving skin information (S110).

Specifically, user identification information of the user is stored in the memory 11.

The processor 12 displays the screen P10 (FIG. 12) on the display.

The screen P10 includes an operation object B10, a field object F10, and an image object IMG10.

The field object F10 is an object that accepts user instructions for inputting the results of a questionnaire (that is, questionnaire information) to a user.

The field object F10 displays the questions to the user.

When the user inputs an answer to a question, the field object F10 accepts the answer as questionnaire information.

The question may include, for example, at least one of the following:

Questions about skin color (e.g., at least one blemish and one dullness);
  Information on skin moisture (for example, at least one of roughness, fine wrinkles, stickiness, and pores);
  Questions about skin problems (e.g., skin problems, acne, and at least one dry skin condition);
  Questions about fragrance preferences (e.g., desired type of fragrance);
  Questions about meals;
  Questions about mental state (e.g., stress level);
  Questions about menstrual cycle; and
  Questions about the time of day (morning or evening, for example).

The image object IMG10 is an image captured by the camera 15.

The operation object B10 is an object that accepts user instructions to direct the image capture by the camera 15.

After step S110, the client device 10 performs determining skin condition (S111).

Specifically, a skin condition determination model for determining a skin condition is stored in the memory 11.

The skin condition determination model defines the correlation between the skin image and the skin condition (e.g., at least one of the moisture content and the sebum content).

When the user inputs an answer to the field object F10 and operate the operation object B10 to capture an image of his or her own skin, the processor 12 inputs the captured image into the image determination model to determine a skin state corresponding to the skin image.

After step S111, the client device 10 performs a dispensing request (S112).

Specifically, the processor 12 transmits the dispensing request data to the server 30.

The dispensing request data includes the following information:

User identification information stored in the memory 11;
  Skin image obtained in step S110;
  Questionnaire information obtained in step S110;
  Skin condition information on the skin condition corresponding to the skin image determined in Step S111;
  Sleep log information stored in the memory 11; and
  Information on the execution date and time of step S112.

After step S112, the server 30 performs identifying external skin factor (S130).

Specifically, the server 30 is connected to an external server (not shown) via a network NW.

The external server is configured to manage external skin factor information on external factors that affect the skin (hereinafter referred to as "external skin factors").

The external skin factors include at least one of the following:

Temperature;

Humidity;

Amount of UV radiation or exposure;

Dispersed amount of fine particulate matter (e.g., PM2.5); and

Dispersed amount of pollen.

After step S130, the server 30 performs determining recipe (S131).

Specifically, a recipe determination model is stored in the memory 31.

In the first example, the recipe determination model defines a correlation between the dispensing amount for each dispensed material and the skin condition.

The processor 32 inputs the skin condition information included in the dispensing request data into the recipe determination model to determine the recipe identification information corresponding to a dispensing amount for each dispensed material according to the user's skin condition.

In the second example, the recipe decision model defines a correlation between the dispensing amount of each dispensed material and the result of the questionnaire.

The processor 32 inputs the questionnaire information included in the dispensing request data into the recipe determination model to determine the recipe identification information corresponding to the dispensing amount of each dispensed material according to the results of the questionnaire to the user.

In the third example, the recipe decision model defines a correlation between the dispensing amount of each dispensed material and the sleep log.

The processor 32 inputs the sleep log information included in the dispensing request data into the recipe determination model to determine the recipe identification information corresponding to the dispensing amount of each dispensed material according to the user's sleep log.

In the fourth example, the recipe decision model defines the correlation between the dispensing amount of each dispensed material and the external skin factor.

The processor 32 inputs the external skin factor information obtained in step S130 into the recipe determination model to determine the recipe identification information corresponding to the dispensing amount of each dispensed material according to the external skin factor.

In the fifth example, the recipe determination model defines the correlation between the combination of the skin condition, the results of the questionnaire, the sleep log, and the external skin factors and the dispensing amount of each dispensed material.

The processor 32 determines recipe identification information corresponding to the dispensing amount for each dispensed material according to a combination of the skin condition information, the questionnaire information, and the sleep log information included in the dispensing request data, and the external skin factor information obtained in step S130.

The processor 32 refers to the recipe information database (FIG. 7) to identify the information in the "recipe" field associated with the identified recipe identification information as the recipe information to be sent to the dispenser 50.

The processor 32 refers to the user information database (FIG. 6) to identify machine identification information associated with the user identification information included in the dispensing request data (hereinafter referred to as "target machine identification information").

The target machine identification information identifies the dispenser 50 to which the recipe information is to be sent.

The processor 32 transmits the identified recipe information to the dispenser 50 corresponding to the target machine identification information.

After step S131, the dispenser 50 performs dispensing (S150).

Specifically, the processor 52 identifies a cartridge corresponding to the cartridge identification information included in the recipe information transmitted from the server 30 from among the cartridges 56a to 56e.

The processor 52 gives a control signal to the driver 55 so that the dispensed material of the dispensing amount included in the recipe information is dispensed from the identified cartridge.

The driver 55 dispenses, from each of the cartridges 56a to 56e, the dispensed material of the dispensing amount included in the recipe information in response to a control signal given by the processor 52.

This provides the user with the dispensed material (e.g., an application agent) corresponding to an ingredient and the dispensing amount according to his or her skin condition.

After step S150, the dispenser 50 performs notifying completion (S151).

The processor 52 sends a success notification to the server 30 when the dispensed material is successfully dispensed.

The processor 52 sends a failure notification to the server 30 when the processor 52 fails to dispense the dispensed material.

The failure notification contains an error code that identifies the cause of the failure.

After step S151, the server 13 performs updating database (S132).

Specifically, the processor 32 adds a new record to the user log information database (FIG. 8) associated with the user identification information included in the dispensing request data in response to the success notification sent from the dispenser 50.

The following information is stored in each field of the new record.

In the "user log ID" field, the unique user log identification information is stored.

In the "date and time" field, information on the execution date and time of step S112 included in the dispensing request data is stored.

In the "skin image" field, the skin image included in the dispensing request data is stored.

In the "questionnaire" field, the questionnaire information included in the dispensing request data is stored.

In the "skin condition" field, the skin condition information (skin condition information corresponding to the skin image and skin condition information corresponding to the medical questionnaire information) included in the dispensing request data is stored.

In the "recipe ID" field, the recipe identification information determined in step S131 is stored.

The processor 32 updates the "cartridge" field associated with the target machine identification information in the machine information database (FIG. 9).

More specifically, the processor 32 refers to the machine information database (FIG. 9) to identify the "cartridge" field associated with the target machine identification information.

The processor 32 refers to the "cartridge ID" field of the identified "cartridge" field to identify a record corresponding to the cartridge identification information included in the recipe information in step S131.

The processor 32 subtracts the value of the dispensing amount contained in the recipe information from the information in the "remaining amount" field of the identified record.

As a result, the remaining amount values of each cartridge 56*a* to 56*e* are updated.

(3-2) Near-End Processing

The near-end process of the present embodiment is described below.

Figure 13:
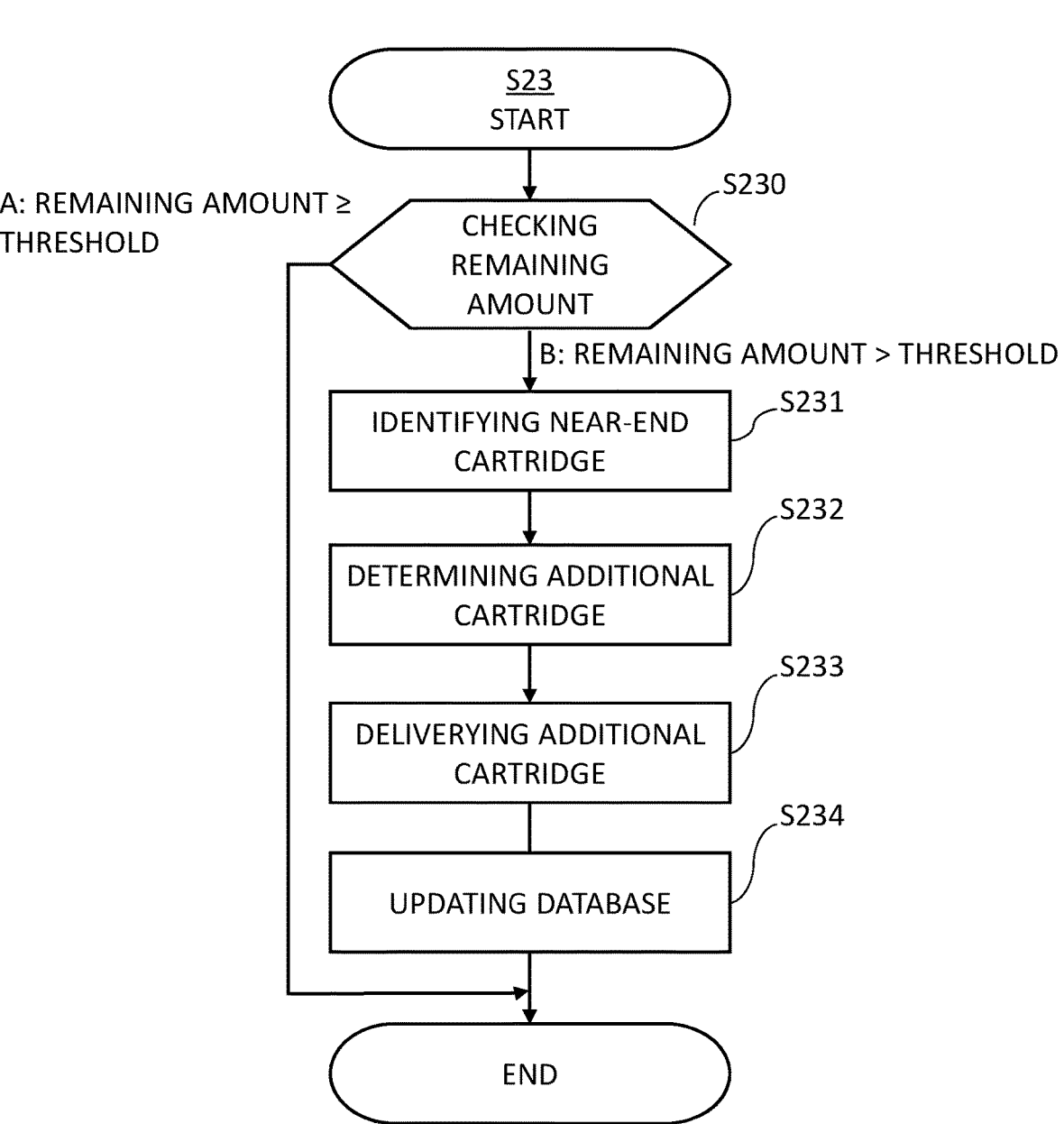
FIG. 13 is a flowchart of the near-end processing of the present embodiment.

FIG. 13 is a flowchart of the near-end processing of the present embodiment.

The process of FIG. 13 is performed after step S132.

As shown in FIG. 13, the server 30 performs checking remaining amount (S230).

Specifically, the processor 32 refers to the user information database (FIG. 6) to identify the information in the "owned machine ID" field (machine identification information) associated with the user identification information included in the dispensing request data.

The processor 32 refers to the machine information database (FIG. 9) to identify the "remaining amount" field associated with the identified machine identification information.

When the remaining amount value stored in the "remaining amount" field is equal to or greater than a predetermined threshold value (S230-A), the processor 32 terminates the process of FIG. 13.

When the remaining amount value stored in the "remaining amount" field is less than a predetermined threshold value (S230-B), the server 30 performs identifying near-end cartridge (S231).

Specifically, the processor 32 refers to the "cartridge ID" field in the machine information database (FIG. 9) to identify the cartridge identification information associated with the remaining amount value that is below the threshold.

The cartridges 56*a* to 56*e* corresponding to the identified cartridge identification information are the near-end cartridges.

After step S231, the server 30 performs determining additional cartridge (S232).

In the first example of step S232, the processor 32 refers to the recipe information database (FIG. 7) to determine the cartridge corresponding to the information in the "cartridge ID" field (cartridge identification information) associated with the recipe identification information identified in step S131 as the next cartridge (hereinafter referred to as the "additional cartridge") to be delivered to the user.

In the second example of step S232, the memory 31 stores a rule that specifies a correlation between a skin condition and a cartridge identification information of a cartridge containing the dispensed material recommended for the skin condition.

The processor 32 identifies the record in the user log information database (FIG. 8) for which the "date and time" field indicates the most recent date and time.

The processor 32 refers to the information in the "skin condition" field of the identified record (i.e., the skin condition) and the rules stored in the memory 31 to determine the additional cartridges.

In the third example of step S232, the processor 32 refers to at least one of the skin condition information, the questionnaire information, and the sleep log information to determine an optimal combination of cartridges for the user.

The processor 32 refers to the "cartridge ID" field in the machine information database (FIG. 9) to identify the cartridge identification information of the cartridges 56*a* to 56*e* disposed in the dispenser 50.

The processor 32 determines a cartridge that falls into the same or a different subclass (e.g., "A2") of the group of cartridges corresponding to the identified cartridge identification information (e.g., "A1") as an additional cartridge.

The additional cartridges are determined by any of the above methods.

After step S233, the server 30 performs delivering additional cartridge (S233).

Specifically, the processor 32 refers to the user information database (FIG. 6) and refers to the "address" field associated with the user identification information included in the dispensing request data to identify the delivery address information of the user.

The processor 32 sends delivery request data to a delivery server (not shown) disposed in a cartridge delivery center.

The delivery request data includes the following information:

Identified shipping address information; and

Cartridge identification information identified in step S232.

The delivery server performs a delivery process of the cartridge according to the delivery request data sent from the server 30.

Specifically, the person in charge of the delivery center ships the cartridge containing the dispensed material corresponding to the cartridge identification information included in the delivery request data to the destination indicated by the delivery destination information included in the delivery request data.

After step S234, the server 23 performs updating database (S234).

Specifically, the processor 32 adds a new record to the delivery log information database (FIG. 10) associated with the user identification information included in the dispensing request data.

The following information is stored in each field of a new record.

In the "delivery log ID" field, the unique delivery log identification information is stored.

In the "date and time" field, information on the execution date and time of step S233 is stored.

In the "cartridge ID" field, the cartridge identification information of the cartridge shipped in step S233 is stored.

According to the present embodiment, when cartridges 56*a* to 56*e* become near-end, a new cartridge is delivered to the user.

This allows the user to continuously provide the user with the dispensed material without making the user aware of the remaining amount of the dispensed material contained in the cartridges 56*a* to 56*e*.

(4) Variations

A variation of the present embodiment is described below.

(4-1) First Variation

First variation is described below.

The first variation is an example of delivering at least one additional cartridge, considering the lead time for delivery.

In step S233 (FIG. 13), the processor 32 of the first variation identifies, among the cartridges corresponding to the cartridge identification information associated with the remaining amount value determined to be greater than or equal to the predetermined threshold value in step S230, a cartridge for which the combination of the remaining amount value and the predetermined delivery lead time is less than the predetermined batch delivery threshold value as a batch delivery cartridge.

The delivery lead time is, for example, the time from when the provision of an additional cartridge is arranged until the additional cartridge is arrived at the user.

The processor 32 includes the cartridge identification information contained in the cartridge identified as the batch delivery cartridge in the delivery request data.

According to the first variation, even for cartridges whose remaining amount value is above a predetermined threshold, cartridges that should be delivered before the remaining amount value falls below the predetermined threshold in consideration of the delivery lead time are shipped together with additional cartridges.

In this way, it can be more reliably avoided that the dispensed material contained in the cartridges 56a to 56e disposed in the dispenser 50 become empty.

(4-2) Second Variation

The second variation is described below.

The second variation is an example in which the remaining amount value is managed by IC chips of cartridges 56a to 56e disposed in the dispenser 50.

The IC chips disposed in each of the cartridges 56a to 56e of the second variation stores the cartridge identification information and the remaining amount value in association with each other.

In step S151 (FIG. 11), when the dispensing is successful, the processor 52 updates the remaining amount value associated with the cartridge identification information stored in the IC chip using the dispensing amount associated with each cartridge identification information included in the recipe information.

The processor 52 transmits the remaining amount value stored in the IC chip to the server 30 via the communication interface 54 or the client device 10.

In this case, the server 30 performs confirming remaining amount (S230) by referring to the remaining amount value transmitted from the dispenser 50.

According to the second variation, the same effect as the present embodiment can be obtained without the server 30 performing management of the remaining amount.

(5) Summary of the Present Embodiment

The summary of the present embodiment is described below.

The first aspect of the present embodiment is a server 30 that can be connected to a dispenser 50 configured to dispense dispensed material, the server 30 including:

a retrieving module configured to retrieve skin information on a user's skin condition;

a determination module configured to determine recipe information for the dispensed material with reference to the skin condition indicated by the skin information;

a transmission module configured to transmit the recipe information to the dispenser 50 to cause the dispenser 50 to dispense the dispensed material in accordance with the recipe information; and an arrangement module configured to arrange for the provision of an additional cartridge to the user of the dispenser 50 if the remaining amount of the dispensed material remaining in the cartridges 56a to 56e of the dispenser 50 is less than a predetermined threshold.

According to a first aspect, an additional cartridge is provided when the remaining amount of the dispensed material contained in the cartridges usable for the dispenser that dispenses the dispensed material according to a skin condition of the user is less than a predetermined threshold.

As a result, in the dispenser that dispenses the dispensed material according to a skin condition of the user, the dispensed material can be continuously provided to the user without making the user aware of the remaining amount of the dispensed material contained in the cartridges disposed in the dispenser.

The second aspect of the present embodiment is the server 30 further including an update module configured to update the remaining amount of the dispensed material contained in the cartridges 56a to 56e of the dispenser 50 in response to the dispensing of the dispensed material by the dispenser 50.

According to the second aspect, the remaining amount of the cartridges 56a to 56e can be managed in real time.

The third aspect of the present embodiment is the server 30 includes the arrangement module arranging for the provision of additional cartridges 56a to 56e if the remaining amount stored in the cartridges 56a to 56e is less than the threshold.

According to the third aspect, the next cartridge can be provided at an appropriate time.

The fourth aspect of the present embodiment is the server 30 further includes a determination module configured to determine batch delivery cartridges 56a to 56e from among the cartridges 56a to 56e whose remaining amount is equal to or greater than the threshold by referring to the predetermined delivery lead time and the remaining amount, wherein the arrangement module arranges for the provision of the batch delivery cartridges 56a to 56e.

According to the fourth aspect, the next cartridge can be provided at an appropriate timing in consideration of the delivery lead time.

The fifth aspect of the present embodiment is a program for causing a computer (e.g., the processor 32) to function as any one of the modules described above.

(6) Other Variations

Other examples of variations are described below.

The memory 11 may be connected to the client device 10 via a network NW.

The memory 31 may be connected to the server 30 via a network NW.

Each step of the above information processing can be performed by any of the client device 10 and the server 30.

For example, if the client device 10 is capable of performing all of the steps of the information processing described above, the client device 10 functions as a stand-alone information processing device that operates without sending requests to the server 30.

In the present embodiment, although an example of obtaining external skin factor information from an external server in step S130 is shown, the present embodiment is not limited to this example.

This embodiment is also applicable to the case where the external skin factor information is included in the questionnaire information.

In this case, step S130 can be omitted.

In the present embodiment, an example is shown in which information on the meal, information on the mental state, and information on the sexual cycle are obtained as the questionnaire information in step S110.

The present embodiment is also applicable to the case where at least one of the information on the meal, the information on the mental state, and the information on the sexual cycle is obtained by an application and stored in the memory 11.

In this case, step S130 can be omitted.

The present embodiment is applicable, for example, to a model that provides additional cartridges to users who pay a predetermined fee every certain period of time (as an example, one month) (hereinafter referred to as a "subscription model").

In this case, an upper limit number of times of use (e.g., number of times of dispensing objects) of the dispenser 50 is predetermined for the user.

Users who wish to use more than the maximum number will have to pay an additional fee.

Additional cartridges will be provided to users who have paid the additional fee, even if the maximum number of times the dispenser 50 has been used has been exceeded.

On the other hand, additional cartridges will not be provided to users who have not paid the additional fee.

In the present embodiment, an example of simultaneously transmitting the skin image, the questionnaire information, the skin condition information, and the sleep log information from the client device 10 to the server 30 is described in step S112.

However, the present embodiment is not limited to this example.

The present embodiment can be applied to any of the following examples:

An example in which each of the skin image, the questionnaire information, the skin condition information, and the sleep log information is transmitted to the server 30 at the timing of obtaining; and An example in which at least one of the skin image, the questionnaire information, the skin condition information, and the sleep log information is obtained from an external server that exists outside the server 30.

In step S233 (FIG. 13) of the present embodiment, when a plurality of cartridges are identified as near-end cartridges in step S231, the delivery process may be executed so that the plurality of near-end cartridges are delivered to the user in a batch.

Although the present embodiment of the present invention are described in detail above, the scope of the present invention is not limited to the above embodiment.

Further, various modifications and changes can be made to the above embodiment without departing from the spirit of the present invention.

In addition, the above embodiments and variations can be combined.

REFERENCE SIGNS LIST

1: Information processing system
10: Client device
11: Memory
12: Processor
13: Input/output interface
14: Communication interface
15: Camera
30: Server
31: Memory
32: Processor
33: Input/output interface
34: Communication interface
50: Dispenser
51: Memory
52: Processor
53: Input/output interface
54: Communication interface
55: Driver
56a to 56e: Cartridges

The invention claimed is:

1. A server that can be connected to a dispenser configured to dispense a dispensed material, the server comprising:
   a retrieving module configured to retrieve skin information on a user's skin condition;
   a determination module configured to:
      determine recipe information for the dispensed material with reference to the skin condition indicated by the skin information; and
      determine a batch delivery cartridge from among the cartridges whose remaining amount is equal to or greater than a predetermined threshold by referring to a predetermined delivery lead time and the remaining amount;
   a transmission module configured to transmit the recipe information to the dispenser to cause the dispenser to dispense the dispensed material in accordance with the recipe information; and
   an arrangement module configured to arrange for a provision of an additional cartridge to the user of the dispenser if a remaining amount of the dispensed material remaining in the cartridge of the dispenser is less than the predetermined threshold, by automatically delivering the additional cartridge to the user.

2. The server of claim 1, further comprising an update module configured to update the remaining amount of the dispensed material contained in the cartridge of the dispenser in response to the dispensing of the dispensed material by the dispenser.

3. The server of claim 2, wherein the arrangement module arranges for the provision of additional cartridges if the remaining amount stored in the cartridges is less than the predetermined threshold.

4. The server of claim 1, wherein the arrangement module arranges for the provision of additional cartridges if the remaining amount stored in the cartridges is less than the predetermined threshold.

5. The server of claim 1, wherein the arrangement module arranges for the provision of the batch delivery cartridge.

6. A method for controlling a dispenser configured to dispense a dispensed material, the method comprising the steps of:
   retrieving skin information on a user's skin condition;
   determining recipe information for the dispensed material with reference to the skin condition indicated by the skin information;
   transmitting the recipe information to the dispenser to cause the dispenser to dispense the dispensed material in accordance with the recipe information;
   determining a batch delivery cartridge from among the cartridges whose remaining amount is equal to or greater than a predetermined threshold by referring to a predetermined delivery lead time and the remaining amount; and arranging for a provision of an additional cartridge to the user of the dispenser if a remaining amount of the dispensed material remaining in the cartridge of the dispenser is less than the predetermined threshold, by automatically delivering the additional cartridge to the user.

7. The method of claim 6, further comprising a step of updating the remaining amount of the dispensed material contained in the cartridge of the dispenser in response to the dispensing of the dispensed material by the dispenser.

8. The method of claim 6, wherein the step of arranging arranges for the provision of additional cartridges if the remaining amount stored in the cartridges is less than the predetermined threshold.

9. The method of claim 6, wherein the step of arranging arranges for the provision of the batch delivery cartridge.

10. The method of claim 7, wherein the step of arranging arranges for the provision of additional cartridges if the remaining amount stored in the cartridges is less than the predetermined threshold.

11. A system comprising a server and a dispenser configured to dispense dispensed material, the server comprising:

a retrieving module configured to retrieve skin information on a user's skin condition;

a determination module configured to:

determine recipe information for the dispensed material with reference to the skin condition indicated by the skin information; and determine a batch delivery cartridge from among the cartridges whose remaining amount is equal to or greater than a predetermined threshold by referring to a predetermined delivery lead time and the remaining amount;

a transmission module configured to transmit the recipe information to the dispenser; and an arrangement module configured to arrange for a provision of an additional cartridge to the user of the dispenser if a remaining amount of the dispensed material remaining in the cartridge of the dispenser is less than the predetermined threshold, by automatically delivering the additional cartridge to the user, wherein the dispenser dispenses the dispensed material in accordance with the recipe information transmitted from the server.

12. The system of claim 11, wherein the dispenser comprises a plurality of cartridges containing the dispensed material, and dispenses the dispensed material contained in the cartridge indicated in the recipe information.

13. The system of claim 12, wherein the dispenser comprises a processor, each cartridges comprises a memory storing remaining amount of the dispensed material contained therein, the processor updates the remaining amount when dispensing the dispensed material and transmits the updated remaining amount to the server.

\* \* \* \* \*